(No Model.)
E. D. AUSTIN.
PICTURE CORD FASTENING.
No. 579,552. Patented Mar. 23, 1897.
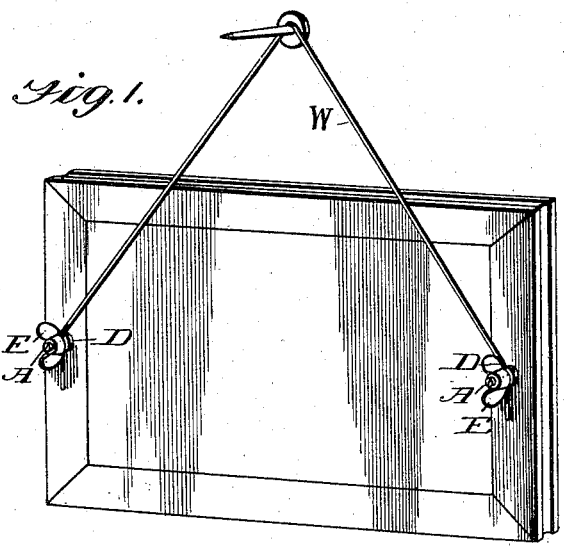
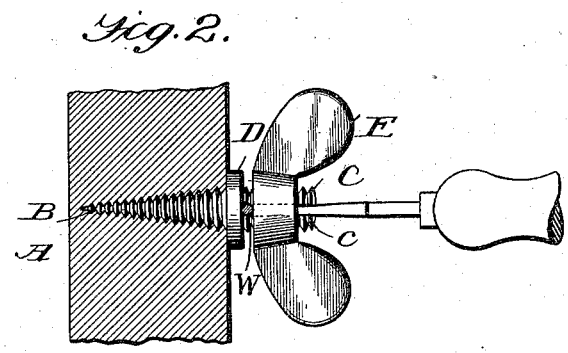
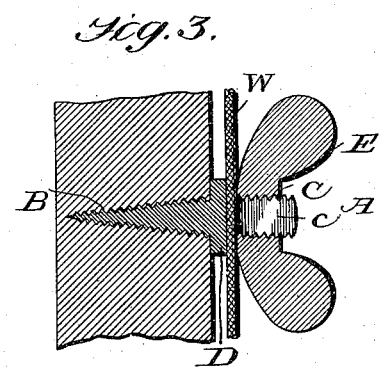
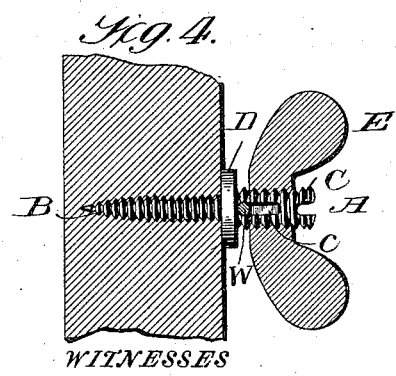
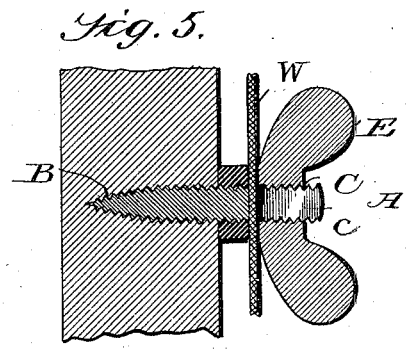
WITNESSES
Jos. C. Stack
James R. Mansfield
INVENTOR
Edward D. Austin
by Alexander Howell
Attorneys

UNITED STATES PATENT OFFICE.

EDWARD D. AUSTIN, OF BATTLE CREEK, MICHIGAN.

PICTURE-CORD FASTENING.

SPECIFICATION forming part of Letters Patent No. 579,552, dated March 23, 1897.

Application filed April 29, 1896. Serial No. 589,563. (No model.)

*To all whom it may concern:*

Be it known that I, EDWARD D. AUSTIN, of Battle Creek, in the county of Calhoun and State of Michigan, have invented certain new and useful Improvements in Picture-Cord Fastenings; and I hereby declare that the following is a full, clear, and exact description thereof, reference being had to the accompanying drawings, which form part of this specification.

This invention is an improvement in combined picture-hangers and fastenings for cords, wires, &c., especially designed for use in suspending pictures, and the device is an improvement upon the ordinary screw-eye, but, like it, may be readily attached to the backs of the picture-frames by hand and then the cord, &c., secured thereto in such manner that it can be quickly and easily lengthened or shortened until the picture hangs properly. The device is also useful otherwise than in connection with picture-frames.

The invention consists in the novel construction and combination of parts hereinafter claimed, and the following description, in connection with the drawings hereto annexed, will fully explain what I consider the best form of the invention now known to me.

In said drawings, Figure 1 is a rear view of a picture suspended by means of my improved devices. Fig. 2 is an enlarged side view of a fastener and hanger. Fig. 3 is a longitudinal section through Fig. 2. Figs. 4 and 5 are detail sections illustrating modified forms of the device.

The hanger and cord-fastener consist of two principal parts, to wit, a collared or washered slotted screw A and a thumb-nut E.

The screw A has one end tapered and threaded into a penetrating portion B, which can be readily forced into wood like an ordinary screw-eye. Its other end C is of uniform diameter and threaded throughout, and preferably diametrically slotted, as at *c*.

Between the parts B C is a collar D, which may be formed in various ways. As shown in Figs. 1 to 4, this collar is made integral with the screw A, but where parts B C are of same general diameter this collar may be formed by running a washer or nut on the screw A until it is about at the bottom of slot *c*. (See Fig. 5.) The object of the collar is to limit the penetration of screw A into the wood and to arrest the movement of the thumb-nut E and form a hard surface against which the nut E can clamp the cord or wire W, which is passed through slot *c*, as shown in the drawings.

The thumb-nut E is of ordinary construction, so as to be turned easily by hand, and part C is preferably of such length that when nut E is screwed against collar D or near thereto the end of part C projects through nut E and affords a key-slot for engagement of a screw-driver, so that the device can be applied or removed like an ordinary screw.

If desired, the parts B C may be of different diameters, and in Fig. 4 I have illustrated the penetrating part B of less diameter than part C, and I have also illustrated how slot *c* may be closed at both ends, but I prefer having it open at one end, because then the cord can be applied in two ways, *i. e.*, if nut E is on part C, the cord can be threaded through slot *c* between nut E and collar D as through an ordinary eye, while if nut E is removed the cord can be first slipped sidewise into the slot, and then the nut screwed on. This latter method of attaching the cord is especially convenient if the ends of cord are frayed or knotted, and enables a cord of greater diameter than the width of slot to be forced therein. Another advantage of the open-ended slot is that it affords a slot for engagement of the screw-driver, as stated.

When nut E is on part C, the device can be screwed into wood like an ordinary screw-eye, the nut affording a sufficient hold for that purpose. In hard wood a screw-driver can be used.

The device does not kink, bend, or mutilate the cord in any way, but clamps it as in a vise between the broad flat surfaces of nut E and collar D, so that it is not weakened by the fastening. By slightly loosening nut E the cord can be drawn through or back, so as to get it the proper length before the nut is screwed home.

I am aware that in electrical fuse-boxes and cut-outs binding-posts have been used which were slotted for the passage of the conducting-wires, which wires were clamped between contact-blocks secured in such slots by nuts, but such devices are not constructed like my picture-cord hanger nor adapted for use as such. Therefore I restrict my claim to the peculiar combined picture-cord fastening herein shown and described.

Having thus described my invention, what I therefore claim as new, and desire to secure by Letters Patent thereon, is—

1. In a combined hanger and fastener of the character described, the combination of a screw having a penetrating tapered end, and having an elongated cord-receiving slot c in its threaded blunt end, and a collar at the base of the slot to limit the penetration of the screw and afford a binding-surface for a cord or wire; with a thumb-nut E screwed on the slotted end of the screw adapted to serve as a means for screwing the hanger in place and also to clamp a cord or wire passed through the slot against the collar, substantially as and for the purpose described.

2. In a combined hanger and fastener the combination of the screw A having a tapered and penetrating end B, and a cylindrical threaded portion C of larger diameter than the tapered threaded penetrating portion and longitudinally slotted as at c, and an integral collar intermediate the penetrating and projecting portions, the parts B, C, D, being integral; with the thumb-nut E screwed on the projecting portion C, and adapted to serve as the means for forcing the screw into the wood and also to clamp a cord or wire against the collar, all substantially as and for the purpose described.

In testimony that I claim the foregoing as my own I affix my signature in presence of two witnesses.

EDWARD D. AUSTIN.

In presence of—
FRANK W. DUNNING,
GEO. E. HOWES, Jr.